(12) United States Patent
Lane

(10) Patent No.: US 11,996,537 B2
(45) Date of Patent: May 28, 2024

(54) PROGNOSTIC LIMITATION TO FUEL CELL POWER OUTPUT FOR IMPROVED EFFICIENCY IN MOBILE MACHINE

(71) Applicant: Caterpillar Inc., Peoria, IL (US)

(72) Inventor: Cameron Thomas Lane, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 130 days.

(21) Appl. No.: 17/492,986

(22) Filed: Oct. 4, 2021

(65) Prior Publication Data
US 2023/0107318 A1   Apr. 6, 2023

(51) Int. Cl.
*B60L 50/75*   (2019.01)
*B60L 7/10*   (2006.01)
(Continued)

(52) U.S. Cl.
CPC ............. *H01M 16/006* (2013.01); *B60L 7/10* (2013.01); *B60L 50/75* (2019.02); *B60L 58/40* (2019.02); *H01M 8/04932* (2013.01); *H01M 8/04947* (2013.01); *H01M 10/4257* (2013.01); *H01M 10/44* (2013.01); *H02J 7/0068* (2013.01); *H02J 7/14* (2013.01); *H02J 7/34* (2013.01); *B60L 2200/40* (2013.01); *B60L 2240/421* (2013.01); *B60L 2240/54* (2013.01); (Continued)

(58) Field of Classification Search
CPC .............. H01M 8/04083; H02J 7/0017; B60L 11/1827
See application file for complete search history.

(56) References Cited

U.S. PATENT DOCUMENTS 8,017,276 B2 * 9/2011 Fujita ................ H01M 8/04626
429/432
10,696,165 B2   6/2020 Bennet et al.
(Continued)

FOREIGN PATENT DOCUMENTS

JP   2012106652 A   6/2012
KR   20130055889 A   5/2013
(Continued)

OTHER PUBLICATIONS

Written Opinion and International Search Report for Int'l. Patent Appln. No. PCT/US2022/044962, dated Jan. 20, 2023 (14 pgs).

*Primary Examiner* — Elim Ortiz

(57) ABSTRACT

Operating a machine includes supplying electric power from a fuel cell to a power bus connected to an electric motor and an energy storage device in a machine operated at a work site, and determining an expected efficiency gain condition based on at least one of terrain data of the work site or machine activity data of the machine. Operating a machine further includes prognostically limiting a power output of the fuel cell based on the determining an expected efficiency gain condition, and charging the energy storage device during occurrence of the expected efficiency gain condition using at least one of a regenerative energy device or the fuel cell. The energy storage device may be discharged during prognostically limiting a power output of the fuel cell so as to share a load demand of the power bus between the fuel cell and the energy storage device. Related apparatus and control logic is also disclosed.

17 Claims, 4 Drawing Sheets

(51) Int. Cl.
     *B60L 58/40*           (2019.01)
     *H01M 8/04858*     (2016.01)
     *H01M 10/42*         (2006.01)
     *H01M 10/44*         (2006.01)
     *H01M 16/00*         (2006.01)
     *H02J 7/00*           (2006.01)
     *H02J 7/14*           (2006.01)
     *H02J 7/34*           (2006.01)

(52) U.S. Cl.
     CPC .................. *B60L 2240/647* (2013.01); *H01M 2010/4271* (2013.01); *H01M 2220/20* (2013.01); *H01M 2250/20* (2013.01)

(56) References Cited

U.S. PATENT DOCUMENTS

| | | |
|---|---|---|
| 10,974,672 B2 | 4/2021 | Kato et al. |
| 2008/0087479 A1* | 4/2008 | Kang .................. H01M 8/0494 180/65.31 |
| 2016/0193937 A1 | 7/2016 | Dalum |
| 2018/0236883 A1 | 8/2018 | Kokubo et al. |
| 2021/0086652 A1 | 3/2021 | Follen et al. |
| 2022/0340048 A1* | 10/2022 | Yokoo ..................... B60L 58/40 |

FOREIGN PATENT DOCUMENTS

| | | |
|---|---|---|
| KR | 20140036664 A | 3/2014 |
| KR | 20150036610 A | 4/2015 |
| KR | 20210053589 A | 5/2021 |

\* cited by examiner

PROGNOSTIC LIMITATION TO FUEL CELL POWER OUTPUT FOR IMPROVED EFFICIENCY IN MOBILE MACHINE

TECHNICAL FIELD

The present disclosure relates generally to operating a mobile machine with electric power from a fuel cell and an energy storage device, and more particularly to prognostically limiting a power output of a fuel cell based on determining an expected efficiency gain condition.

BACKGROUND

A great many different configurations are known in the field of power systems for mobile machines. Mobile machines powered by combustion engines running on hydrocarbon fuels have been in widespread use throughout the world for well over a century. In recent decades interest in reducing various emissions as well as utilizing alternative fuel resources has driven the development of hybrid systems splitting or sharing power between electric motors and combustion engines, or employing a combustion engine to produce electric power, for example. More recently machines that are fully electric have entered the market.

Fuel cells consume hydrogen or another fuel source such as an alcohol fuel or traditional hydrocarbon fuel to generate electricity. Most systems employing a fuel cell, either as part of a hybrid design, or in a fully electric system, also utilize an energy storage device typically a battery. The fuel cell is commonly arranged to provide electric power for operating the machine a majority of the time as well as maintaining a charge of the machine's on-board battery. Batteries have been demonstrated to effectively provide, or assist in providing, fast transient response to load changes as well as supplementing peak power loads. Fuel cells in these systems are often controlled to maintain charge of the battery such that between the battery and the fuel cell the total power can be provided to the machine that is desired at any given time. In certain instances, however, consumption of fuel for the fuel cell can be deemed excessive given that fuel cell efficiency tends to vary as a function of output power, which may be less than optimally regulated. United States Patent Application Publication No. 20160111743A1 to Votoupal is directed to a method of generating power with a fuel cell. The Votoupal methodology could be implemented in any of a variety of machine applications.

SUMMARY

In one aspect, a method of operating a machine includes supplying electric power from a fuel cell to a power bus connected to an electric motor and an energy storage device in a machine operated at a work site, and determining an expected efficiency gain condition based on at least one of terrain data of the work site or machine activity data of the machine. The method further includes prognostically limiting a power output of the fuel cell based on the determining an expected efficiency gain condition, and charging the energy storage device during occurrence of the expected efficiency gain condition.

In another aspect, a power system for a machine includes a fuel cell, an energy storage device, and a power bus electrically connected to the fuel cell and the energy storage device. The power system further includes a power system control unit coupled to the fuel cell and the energy storage device. The power system control unit is structured to receive at least one of terrain data of a work site or machine activity data of a machine, and to determine an expected efficiency gain condition based on the at least one of the terrain data of the work site or machine activity data of the machine. The power system control unit is further structured to prognostically limit a power output of the fuel cell based on the determined expected efficiency gain condition, and to charge the energy storage device, using at least one of regenerative electric power from a regenerative energy device of the machine or electric power supplied by the fuel cell, during occurrence of the expected efficiency gain condition.

In still another aspect, a control system for a power system in a machine includes a power system control unit structured for coupling to a fuel cell and an energy storage device each electrically connected to a power bus in a power system in a machine. The power system control unit is further structured to receive at least one of terrain data of a work site or machine activity data of the machine, to receive location data of the machine, and to determine an expected efficiency gain condition based on the location data and the at least one of terrain data of the work site or machine activity data of the machine. The power system control unit is further structured to prognostically limit a power output of the fuel cell based on the determined expected efficiency gain condition, and to charge the energy storage device during occurrence of the expected efficiency gain condition.

DETAILED DESCRIPTION

Figure 1:
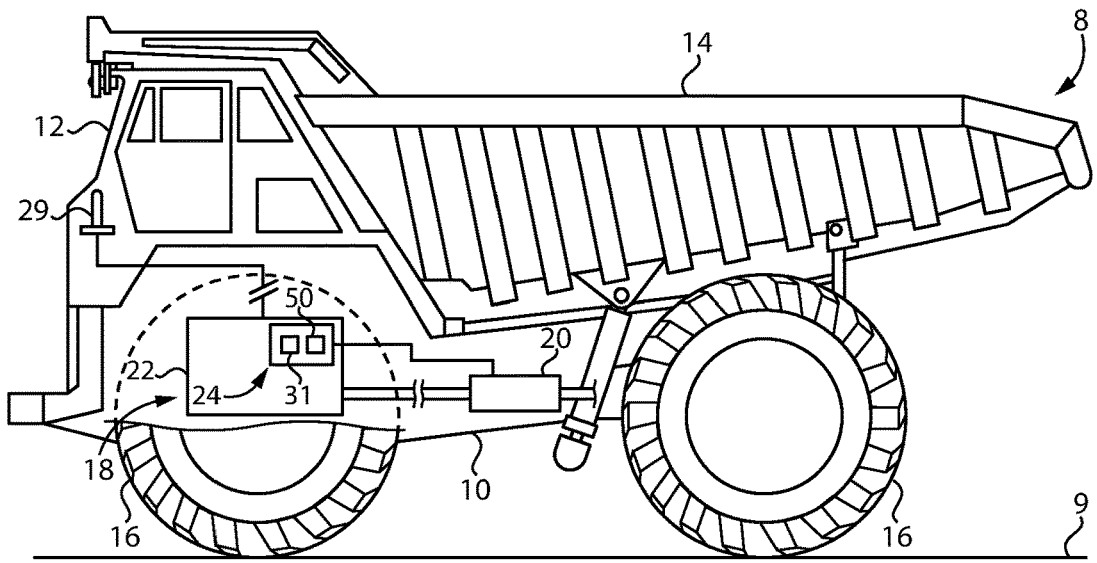
FIG. 1 is a side diagrammatic view of a machine, according to one embodiment.

Referring to FIG. 1, there is shown an off-highway machine 8, according to one embodiment. Machine 8 includes a machine frame 10 with a cab 12 and a dump bed 14 supported thereon. Ground-engaging elements 16 in the form of wheels support machine 8 upon a substrate at a work site 9. Dump bed 14 can be raised and lowered, enabling machine 8 to load a material such as rock, ore, soil, et cetera, and transport the load to a desired dump location. Machine 8 will typically be operated for use in a mining application, a construction site, or any of a variety of other known off-highway hauling machine applications, however, the present disclosure is not thereby limited. In other instances, machine 8 might be other than a hauling machine, such as a dozing machine or tractor, a wheel loader, a motor grader, a backhoe, an excavator, a shovel, or any of a wide variety of other types of equipment. Rather than a wheeled machine, machine 8 could be a track-type machine in some embodiments.

Machine 8 further includes a power system 18. Power system 18 can include an entirely electric power system such that machine 8 is operated entirely or substantially entirely upon electric power, although various hybrid systems may fall within the scope of the present disclosure. A transmission 20 is shown coupled to power system 18 and may be operated to vary machine 8 amongst several different gear ratios for propulsion. Machine 8 could be autonomously operated, semi-autonomously operated, or manually operated. As will be further apparent from the following description, machine 8 is contemplated for extended range operation and increased efficiency in comparison with certain known strategies.

Figure 2:
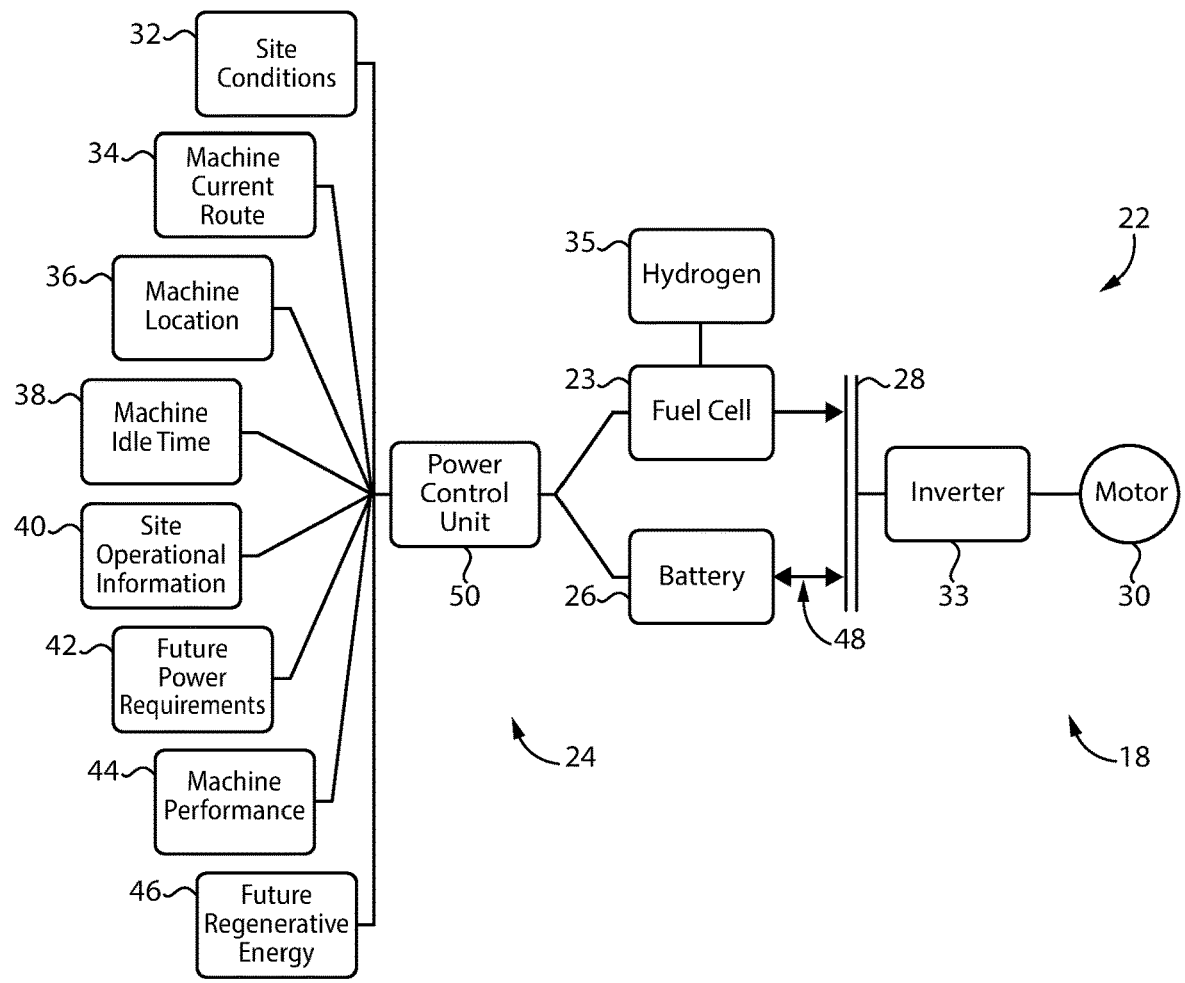
FIG. 2 is a diagram of a power system for a machine, according to one embodiment.

Referring also now to FIG. 2, power system 18 may include electric power components 22 such as a fuel cell 23, an energy storage device 26, and an electric motor 30. Electric motor 30 could be a main drive motor, one of a plurality of individual wheel motors, or an electric motor used for purposes other than propulsion in some embodiments such as an electric motor for operating a hydraulic pump onboard machine 8. Electric power components 22 may further include an electric power bus 28 electrically connected to fuel cell 23 and energy storage device 26, and an inverter 33 electrically connected between power bus 28 and electric motor 30. Electrical connection apparatus 48 including suitable cabling electrically connects fuel cell 23 and energy storage device 26 to power bus 28. In one embodiment, fuel cell 23 is a hydrogen fuel cell, fluidly connected to a hydrogen supply 35, storing hydrogen in a compressed gaseous state, for example. Fuel cell 23 could utilize a different type of fuel in other instances such as an alcohol fuel, a hydrocarbon fuel, or still another. Energy storage device 26 includes a battery 26 of any suitable type in a practical implementation. In other instances, energy storage device 26 could include one or more capacitors.

Power system 18 further includes a power control system 24. Power control system 24 includes a power control unit 50 and a computer readable memory 31. Power control system 24 may also include a receiver or antenna 29 that receives machine position data relative to operating machine 8 and navigating machine 8 at work site 9, for example. Power control unit 50 can include any suitable electronic control unit having a central processing unit, such as a microprocessor or a microcontroller, or a field programmable gate array (FPGA). Computer readable memory 31 stores executable program instructions as well as various data of or relating to machine 8 or to work site 9, which may be dynamic or non-dynamic data as further discussed herein, as well as various maps, tables, and other information used in operating machine 8 and controlling power system 18. Computer readable memory 31 can be any suitable volatile or non-volatile memory, including RAM, ROM, DRAM, SDRAM, EEPROM, FLASH, or still another. Power control unit 50 can be resident on machine 10 as illustrated. In other embodiments, power control unit 50 could be off-board and located upon another working machine, at a site management trailer, or remote from the work site entirely.

Also shown in FIG. 2 are various data inputs that may be stored, at least temporarily, on computer readable memory 31, and used by power control unit 50 in executing the various actions of operating machine 8 further discussed herein. An input 32 includes site conditions. Site conditions can include one or more of rolling resistance, temperature, elevation, wind speed, soil moisture, or various others. A machine current route input is shown at 34, and can include coordinates defining or affecting a preestablished machine navigation route at work site 9, such as a route to and from, or inclusive of, a loading location and a dumping location, for example. An input 36 includes machine location, which may be a present machine location at work site 9 indicated, for example, by global or local positioning signals received by way of antenna 29. Machine idle time 38 is another input that can be directly or indirectly related to a time that machine 8 is expected to remain idled waiting, for instance, to receive or dump a load of material at a location at work site 9. It will be appreciated that machine idle time 34 can be dynamic, varying for instance based upon progress of other machines loading or dumping, backups caused by other machines, a number of other machines in a fleet of machines of which machine 8 is a part that are presently waiting to receive a load or dump a load as the case may be. A site operational information input is shown at 40 and can include, for example, factors such as a number of machines currently in use, cycle times for loading and/or dumping, shift change information, or a variety of other types of operational information. Future power requirements are shown at 42 and can include data representative of expected electric power machine 8 is expected to need for performing a given task, completing a shift, traveling a prescribed distance, or any other conceivable future power requirement. Machine performance input is shown at 44 and may include factors specific to operation of machine 8 relative to efficiency, speed, or still other factors. A future regenerative energy input is shown at 46 and can include stored information relating, for example, to an expected part of a travel path of machine 8 that descends a slope, where machine 8 slows down on a level grade, or performs an operation where regenerative energy is available such as lowering dump bed 14.

Fuel cell efficiency can vary as a function of output power as noted above. It has been observed that operating a fuel cell such as fuel cell 23 at partial load will consume less fuel, in the illustrated case hydrogen, over the course of a work cycle. Thus, if the performance requirements for operating machine 8 can be satisfied by operating fuel cell 23 at a partial load, less fuel will be consumed and a range of machine 8 or other measure of capability can be extended. It has also been observed that if battery charge is fully maintained even where unnecessary, the capacity for capturing regenerative energy is limited. The present disclosure balances these factors by selectively operating fuel cell 23 at a reduced or limited power output, at times, and selectively load sharing with energy storage device 26, at times, to take advantage of regenerative energy opportunities that would otherwise be lost or less than fully realized. Power system 18, and power system control unit 50 in particular, may be structured to control an electric power output of fuel cell 23 while also selectively controlling charging and discharging energy storage device 26 to best take advantage of various opportunities for harvesting regenerative energy and operating fuel cell 23 at partial load while still satisfying performance requirements.

To this end, power system control unit 50 is coupled to fuel cell 23 and energy storage device 26, and structured to receive at least one of terrain data of work site 9 or machine activity data of machine 8. Terrain data in this context may include previously stored data indicative of locations, distance, and grade(s) of a travel path at work site 9 to be traversed by machine 8. Machine activity data can be data indicative of machine activities that are expected to take place such as raising bed 14, lowering bed 14, slowing a ground speed of machine 8 idling machine 8, or digging, dozing, or various other machine activities in different embodiments. Terrain data and potentially also machine activity data will typically be gathered on-site, such as by navigating machine 8 to perform a predefined work cycle and storing the data, or gathered from another machine such as service truck, a drone, or another fleet machine similar to machine 8, operated to scan and record properties or characteristics of work site 9. Power system control unit 50 may be further structured to determine an expected efficiency gain condition based on the at least one of terrain data of the work site or machine activity data of machine 8, and typically also based on machine location data. An expected efficiency gain condition means a scenario where at least one of fuel cell 23 or energy storage device 26 can be selectively operated as described herein to increase operational efficiency in terms of energy usage, speed, time, or still another measure of efficiency. Selective operation means reducing power output, increasing power output, turning on, turning off, charging, discharging. An expected efficiency gain condition can be a machine idling condition, or a regenerative energy availability condition such as descending a slope or braking machine 8, for example, as further discussed herein.

Power system control unit 50 may be further structured to prognostically limit a power output of fuel cell 23, based on the determined expected efficiency gain condition. This means that a power output of fuel cell 23 can be selectively limited in anticipation of a subsequent expected efficiency gain condition to be exploited. Power system control unit 50 is further structured to charge energy storage device 26, using at least one of regenerative electric power from a regenerative energy device of machine 8 or electric power supplied by fuel cell 23, during occurrence of the expected efficiency gain condition. Another way to understand this principle is that energy storage device 26 can be charged using electric power supplied by a regenerative energy device, or charged using electric power produced by fuel cell 23 directly, the significance of which will be further apparent from the following description. In the illustrated embodiment transmission 20 can operate as a regenerative energy device by operating electric motor 30 in a generator mode, for example. Individual wheel motors could analogously serve as a regenerative energy device, as well as components in a hydraulic system during lowering bed 14, for example. Those skilled in the art will contemplate still other regenerative energy devices and/or strategies that could be used.

Figure 3:
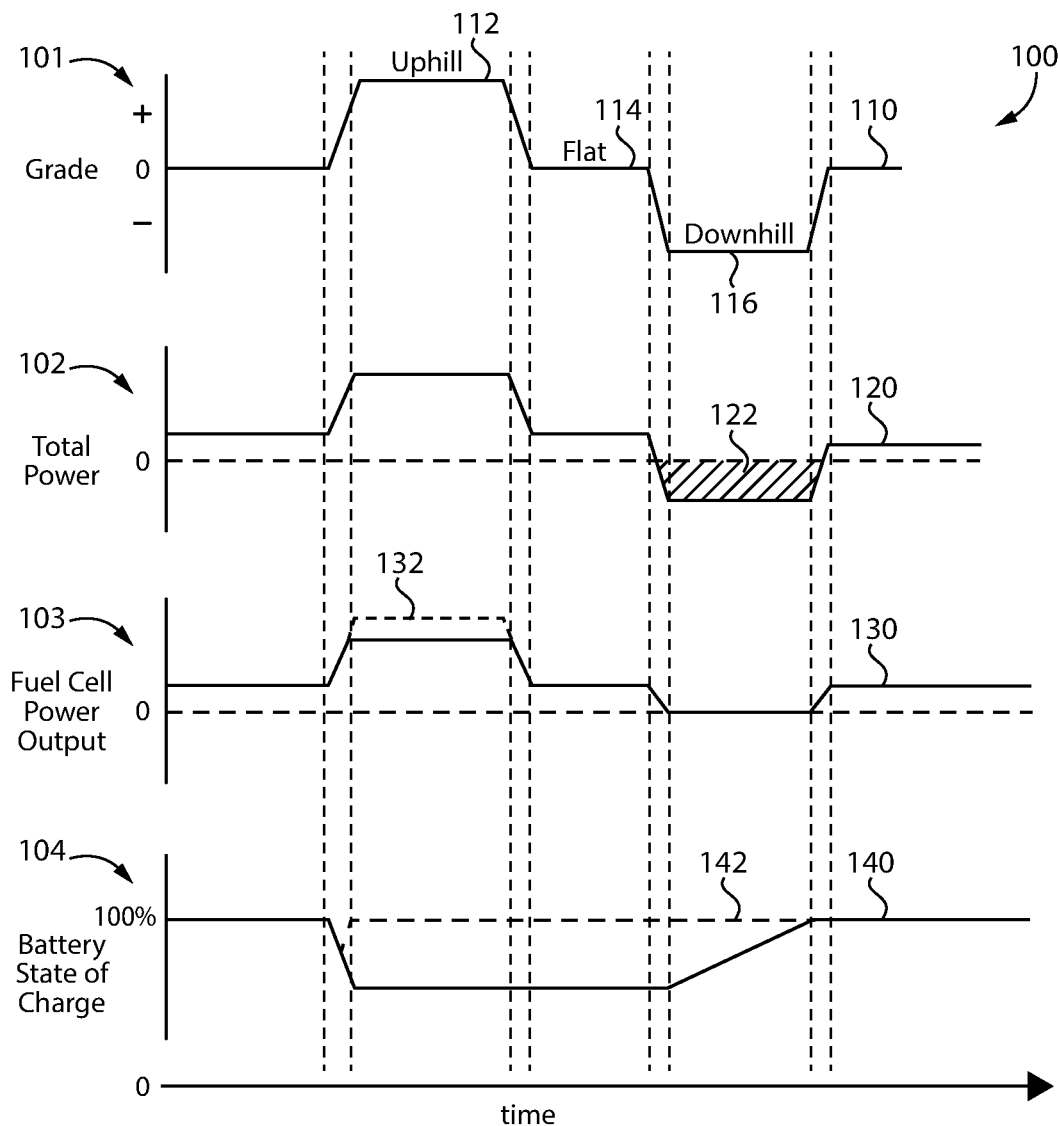
FIG. 3 is a diagram of machine and power system states, according to one embodiment.

Referring now to FIG. 3, there is shown a diagram 100. Diagram 100 includes illustrations of example machine and power system functioning over the course of time. A grade chart is shown at 101 and represents a grade of a substrate across which machine 8 is traveling. A grade trace 110 includes an uphill segment 112, a flat segment 114, and a downhill segment 116. Diagram 100 also includes a chart 102 representing total power produced by power system 18 over the relevant period of time. A power trace 120 shows total power. A region 122 defined by trace 120 represents a regeneration opportunity corresponding, for example, to downhill segment 116. A chart 103 represents fuel cell power output, including a power output trace 130. Trace 130 shows example fuel cell power output according to the present disclosure, and a typical fuel cell power output trace for a known strategy is shown at 132. It can be noted fuel cell power output according to the present disclosure is limited during a time where fuel cell power output in trace 132 is not limited. Limiting a power output according to the present disclosure can include limiting power output to a level that is greater than zero. A chart 104 shows battery state of charge, and includes a charge trace 140 representing battery state of charge according to the present disclosure, in comparison to a trace 142 showing battery state of charge according to a typical known strategy.

From diagram 100 it can be seen that when machine 8 is climbing a grade (uphill segment 112), fuel cell power output is limited, and battery state of charge 140 is decreased, with energy storage device 26 discharging during prognostically limiting a power output of fuel cell 23 so as to share a load demand of power bus 28 between fuel cell 23 and energy storage device 26. In this way fuel cell 23 can be run at reduced power, allowing energy storage device 26 to share the load, and increase its energy storage capacity. It will be recalled that fuel cell operation can be more efficient at a partial power output. Accordingly, during the time that fuel cell power output is limited fuel cell 23 will be operating at a relatively higher efficiency. With battery state of charge 140 now reduced, when regenerative energy can be harvested such as during downhill segment 116 energy storage device 26 has the capacity to store harvested regenerative energy optimally. It can be seen from trace 142 that maintaining a battery state of charge at 80%, 90%, or another target level, would limit or eliminate the opportunity to capture the theoretically available regenerative energy. Thus, it will also be appreciated that the prognostic limitation to the power output of fuel cell 23 is occurring in advance of the regenerative energy availability condition occurring during downhill segment 116.

Figure 4:
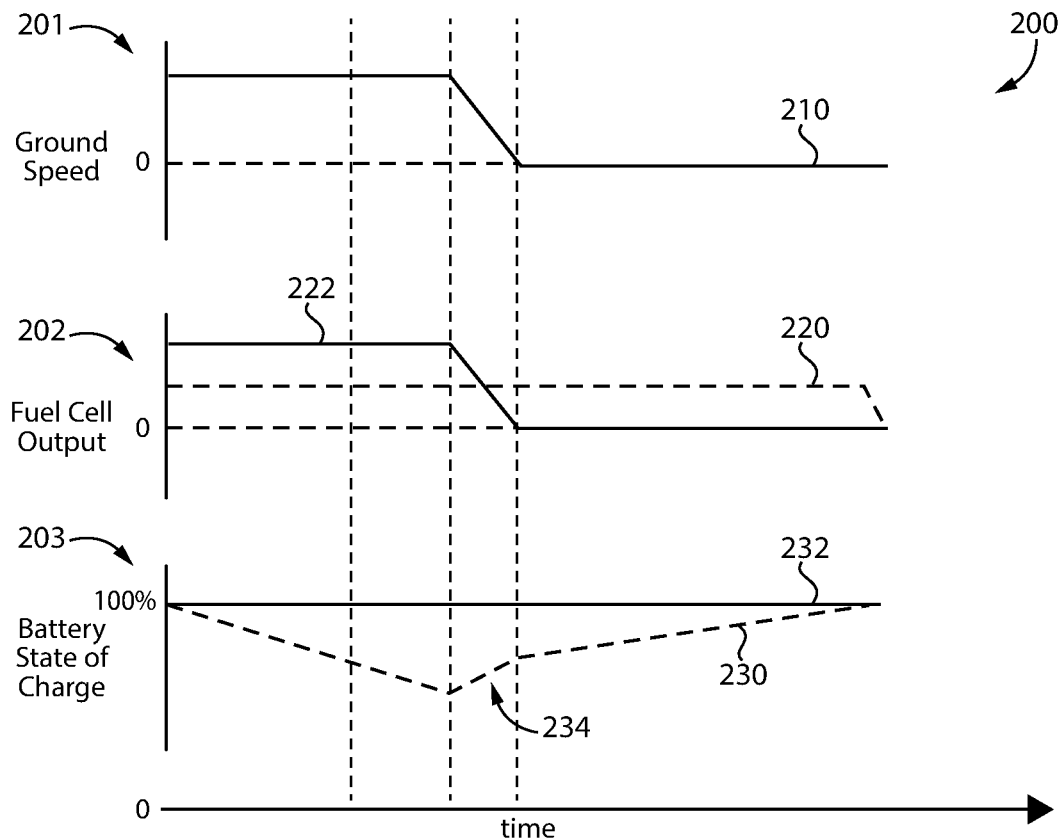
FIG. 4 is another diagram of machine and power system states, according to one embodiment.

Referring now to FIG. 4, there is shown a diagram 200 illustrating another instance of prognostically limiting a power output of fuel cell 23. Diagram 200 includes a chart 201 illustrating a ground speed of machine 8, a chart 202 illustrating fuel cell power output, and a chart 203 illustrating battery state of charge. Chart 201 includes a ground speed trace 210 showing a stable ground speed initially, then braking of machine 8, followed by ground speed of zero where machine 8 is at a machine idling condition. The machine idling condition is another example of an expected efficiency gain condition determined by power control unit 50. It will also be appreciated the machine idling condition may precede one of a loading action or a dumping action by machine 8. A power output trace 220 in chart 202 shows fuel cell output according to the present disclosure in comparison with a trace 220 showing fuel cell output according to a typical known strategy. It can be seen that in the known strategy fuel cell output is maintained at a relatively high level, such as a full load level, then reduced as ground speed drops, followed by fuel cell output at a reduced level while ground speed is zero and machine 8 is idling. According to the present disclosure, and as shown by trace 220, fuel cell power output is prognostically limited and maintained while ground speed is zero and machine 8 is idling. In chart 203 it can be seen that a trace 230 shows battery charge state according to the present disclosure reducing as energy storage device 26 discharges to share the load demand on power bus 28 with fuel cell 23. At numeral 234 battery state of charge 230 increases relatively steeply as energy storage device 26 is regeneratively charged using braking energy of machine 8. Subsequent to the harvesting of regenerative energy battery state of charge 230 continues to increase as energy storage device 26 is charged using electric power supplied by fuel cell 23. It can also be appreciated from diagram 200 that the present disclosure enables a battery state of charge to be reduced, then replenished by prognostically limiting a power output of fuel cell 23, whereas in the typical strategy 232 battery state of charge remains at a target state of charge. This also enables fuel cell 23 to operate at a partial load associated with increased efficiency, extending a range of machine 8 or otherwise improving over typical strategies.

INDUSTRIAL APPLICABILITY

Figure 5:
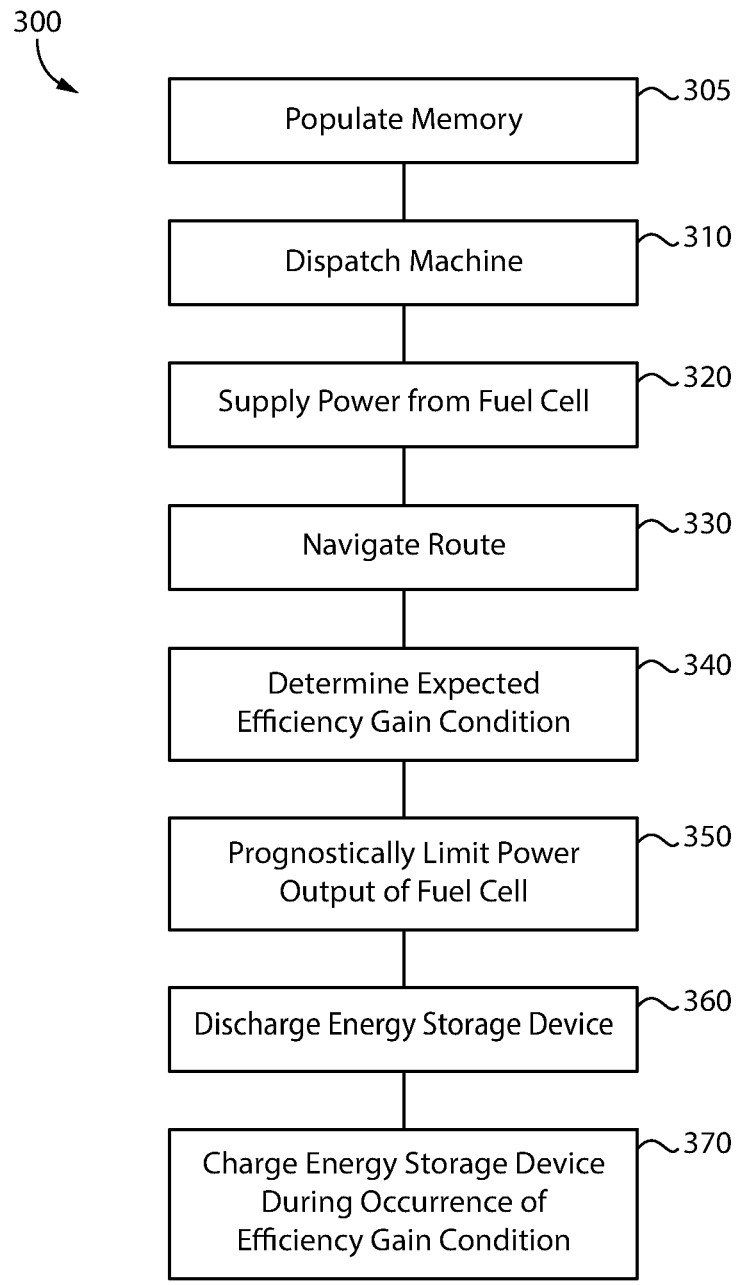
FIG. 5 is a flowchart of example methodology and logic flow, according to one embodiment.

Referring to the drawings generally, but also now to FIG. 5, there is shown a flowchart 300 according to one embodiment, and commencing at a block 305 to populate memory 31 in control system 24. It will be recalled that memory 31 can be populated with a variety of types of data, including terrain data of work site 9, site condition data, and a various other types of information including but not limited to the data inputs depicted in FIG. 2. From block 305 flowchart 300 can advance to a block 310 to dispatch machine 8. Dispatching machine 8 can include autonomously dispatching machine 8 with a dispatching control signal, instructing an operator to commence navigating machine 8 according to a prescribed or planned travel path, or some other dispatching mechanism. From block 310, flowchart 300 may advance to a block 320 to supply electric power from fuel cell 23 to power bus 28. At this point, machine 8 will be operated on electric power produced by fuel cell 23 and/or drawn from energy storage 26 depending upon operating conditions and/or various other considerations known to those skilled in the art. From block 320, flowchart 300 may advance to a block 330 to navigate a route, including a route to a loading location, a dumping location, to traverse a grading or dozing route, or still another.

From block 330, flowchart 300 advances to a block 340 to determine an expected efficiency gain condition. As discussed herein determining an expected efficiency gain condition can include a determination that machine 8 is expected to traverse a segment of a route, such as a downhill segment, slow down, or arrive at an idling location, a dumping location, or otherwise satisfy a state where an efficiency gain can be realized. From block 340, flowchart 300 may advance to a block 350 to prognostically limit a power output of fuel cell 23 as described herein. From block 350, flowchart 300 may advance to a block 360 to discharge energy storage device 26. It will further be recalled that memory 31 stores site condition data including, potentially among other things, rolling resistance data, temperature data, or altitude data. Any or all of these types of data, and still others, can be information used by power system control unit 50 in prognostically limiting a power output of fuel cell 23 and/or charging or discharging energy storage device 26. Where a work site or part of a work site is expected to produce higher rolling resistance fuel cell 23 might be reduced in power output to a lesser relative extent than where rolling resistance is lower as machine power requirements might thereby be higher and regenerative energy availability lower. Ambient temperature and/or altitude may also affect machine power requirements, fuel cell or battery charging or discharging efficiency, or still other factors, and thus serve as bases for whether or the extent to which fuel cell power output is to be reduced and/or whether or the extent to which battery state of charge is to be manipulated and exploited.

As discussed herein, discharging energy storage device 36 can include sharing a load demand of power bus 28 with fuel cell 23. It should be appreciated, however, that discharging energy storage device 26 could include discharging energy storage device 26 for purposes other than load sharing, such as operating a pump to pressurize an accumulator in a hydraulic system of machine 8, for instance. From block 360, flowchart 300 may advance to a block 370 to charge energy storage device 26 during occurrence of the expected efficiency gain condition. As discussed herein in connection with FIG. 3 charging energy storage device 26 during occurrence of an efficiency gain condition can include regeneratively charging energy storage device 26. As discussed in connection with FIG. 4 charging energy storage device 26 during occurrence of the efficiency gain condition could include charging energy storage device 26 using electric power produced by fuel cell 23, or potentially a sequential or even simultaneous combination of regenerative and fuel cell charging.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a machine comprising:
   supplying electric power from a fuel cell to a power bus connected to an electric motor and an energy storage device in a machine operated at a work site;
   determining an expected efficiency gain condition based on at least one of terrain data of the work site or machine activity data of the machine;
   prognostically limiting a power output of the fuel cell based on determining the expected efficiency gain condition;
   charging the energy storage device during occurrence of the expected efficiency gain condition;
   discharging the energy storage device during prognostically limiting a power output of the fuel cell so as to share a load demand of the power bus between the fuel cell and the energy storage device; and
   wherein prognostically limiting the power output of the fuel cell includes reducing the power output of the fuel cell.

2. The method of claim 1 wherein prognostically limiting the power output includes limiting the power output to a level that is greater than zero.

3. The method of claim 1 wherein charging the energy storage device includes charging the energy storage device using electric power supplied by the fuel cell.

4. The method of claim 3 wherein determining the expected efficiency gain condition includes determining a machine idling condition.

5. The method of claim 4 wherein the machine includes an off-highway hauling machine, and the machine idling condition includes a machine idling condition preceding one of a loading action or a dumping action.

6. The method of claim 1 wherein charging the energy storage device includes regeneratively charging the energy storage device.

7. The method of claim 6 wherein the machine includes an off-highway hauling machine, and regeneratively charging the energy storage device includes regeneratively charging the energy storage device using braking energy.

8. The method of claim 1 wherein prognostically limiting the power output includes limiting the power output while the machine is climbing a grade.

9. A power system for a machine comprising:
   a fuel cell;
   an energy storage device;
   a power bus electrically connected with the fuel cell and the energy storage device; and a power system control unit coupled to the fuel cell and the energy storage device;

the power system control unit is structured to:

receive at least one of a terrain data of a work site or a machine activity data of a machine;

determine an expected efficiency gain condition based on the at least one of the terrain data of the work site or the machine activity data of the machine;

prognostically limit a power output of the fuel cell via reducing the power output of the fuel cell based on the determined expected efficiency gain condition;

discharge the energy storage device to share a load demand of the power bus between the fuel cell and the energy storage device during the prognostic limitation to the power output of the fuel cell; and charge the energy storage device, using at least one of regenerative electric power from a regenerative energy device of the machine or electric power supplied by the fuel cell, during occurrence of the expected efficiency gain condition.

10. The power system of claim 9 wherein the fuel cell includes a hydrogen fuel cell and the energy storage device includes a battery.

11. The power system of claim 9 wherein the expected efficiency gain condition includes a machine idling condition, and the power system control unit is further structured to charge the energy storage device using electric power supplied by the fuel cell during the machine idling condition.

12. The power system of claim 11 wherein the power system control unit is further structured to initiate the prognostic limitation to the power output in advance of the machine idling condition.

13. The power system of claim 9 wherein the expected efficiency gain condition includes a regenerative energy availability condition, and the power system control unit is further structured to charge the energy storage device using electric power supplied by a regenerative energy device of the machine.

14. The power system of claim 13 wherein the power system control unit is further structured to increase a charging capacity of the energy storage device, based on the discharging of the energy storage device, while the machine is climbing a grade, and to charge the energy storage device using electric power supplied by the regenerative energy device while the machine is subsequently descending a grade.

15. A control system for a power system in a machine comprising:

a power system control unit structured for coupling with a fuel cell and an energy storage device each electrically connected to a power bus in a power system in a machine;

the power system control unit being further structured to:

receive at least one of a terrain data of a work site or a machine activity data of the machine;

receive a location data of the machine;

determine an expected efficiency gain condition based on the location data and the at least one of the terrain data of the work site or the machine activity data of the machine;

prognostically reduce a power output of the fuel cell based on the determined expected efficiency gain condition;

discharge the energy storage device to share a load demand of the power bus between the fuel cell and the energy storage device during the prognostic reduction to the power output of the fuel cell; and charge the energy storage device during occurrence of the expected efficiency gain condition.

16. The control system of claim 15 further comprising a computer readable memory storing at least one of rolling resistance data, temperature data, or altitude data, and the power control unit is further structured to prognostically limit the power output of the fuel cell based on the at least one of rolling resistance data, temperature data, or altitude data.

17. The control system of claim 15 wherein the efficiency gain condition includes a regenerative energy availability condition, and the power system control unit is further structured to:

charge the energy storage device using electric power supplied by a regenerative energy device of the machine during the regenerative energy availability condition;

determine a second expected efficiency gain condition that includes a machine idling condition; and charge the energy storage device using electric power supplied by the fuel cell during the machine idling condition.

* * * * *